(12) United States Patent
Tallman et al.

(10) Patent No.: US 6,425,465 B1
(45) Date of Patent: Jul. 30, 2002

(54) LOCKING WHEEL CHOCK APPARATUS FOR SINGLE TIRE

(75) Inventors: Andrew Tallman, Manhattan Beach; Robert Fox, Wilmington, both of CA (US)

(73) Assignee: Norco Industries, Inc., Compton, CA (US)

(*) Notice: Subject to any disclaimer, the term of this patent is extended or adjusted under 35 U.S.C. 154(b) by 0 days.

(21) Appl. No.: 09/395,783

(22) Filed: Sep. 14, 1999

(51) Int. Cl.⁷ .................................................. B60P 7/08
(52) U.S. Cl. .............................. 188/32; 188/36; 410/30
(58) Field of Search ............................ 188/32, 36, 4 R, 188/19, 20, 21, 22; D12/217; 410/30, 49

(56) References Cited

U.S. PATENT DOCUMENTS

| | | | |
|---|---|---|---|
| 1,174,410 A | 3/1916 | Hajasok | |
| 2,418,279 A | 4/1947 | Sax et al. | |
| 2,475,111 A | * 7/1949 | Ridland | 188/32 |
| 2,773,564 A | 12/1956 | Garard, Sr. | |
| 2,822,063 A | * 2/1958 | Hampton | 188/32 |
| D204,402 S | 4/1966 | Schessl | |
| 3,305,050 A | 2/1967 | Newberry | |
| 3,338,338 A | * 8/1967 | Lindeen | 188/32 |
| 3,444,963 A | 5/1969 | Davis | |
| 3,493,083 A | 2/1970 | Lightowler | |
| 3,547,228 A | 12/1970 | Wiley | |
| 3,647,029 A | 3/1972 | Hanley | |
| 3,684,060 A | 8/1972 | Waddle | |
| 3,799,069 A | 3/1974 | Szala et al. | |
| 3,800,917 A | 4/1974 | Vick | |
| 3,810,530 A | 5/1974 | Jay | |
| 3,845,845 A | 11/1974 | Geisthoff | |
| 3,993,167 A | 11/1976 | Reed | |
| 4,140,206 A | 2/1979 | Yamazaki et al. | |
| 4,144,951 A | 3/1979 | Rea | |
| 4,155,429 A | 5/1979 | Schessl | |

| | | |
|---|---|---|
| D253,408 S | 11/1979 | Sargent |
| D268,409 S | 3/1983 | Moussette |
| 4,711,325 A | 12/1987 | Mountz |

(List continued on next page.)

FOREIGN PATENT DOCUMENTS

| | | | |
|---|---|---|---|
| DE | 349447 | | 3/1922 |
| DE | 629963 | | 5/1936 |
| EP | 0405890 | * | 6/1989 |
| GB | 1066 | | 11/1896 |

Primary Examiner—Matthew C. Graham
Assistant Examiner—Melody M. Burch
(74) Attorney, Agent, or Firm—Michael H. Minns; Hahn Loeser & Parks LLP (57) ABSTRACT

A locking wheel chock apparatus for use with tent trailers, travel trailers and boat trailers having single or dual axles. The chock apparatus functions not only to hold a trailer in position, but also to limit the rocking or rotational movement of tire and wheel combination where a tent or travel trailer is used for camping, i.e. living conditions. The chock apparatus generally comprises a pair of metal chock assemblies which are movably linked together by a screw driven mechanism for tightening and loosening that the chock assemblies about that the tread area of a single tire and wheel assembly. A first embodiment of the chock apparatus uses a shaft-like drive mechanism having a centrally located hand grip and right and left hand thread screws. Both manual and wrench assisted tightening and loosening of the chock assemblies is attainable. A second embodiment employs a drive mechanism comprising a single threaded Acme drive screw located in side two longitudinally telescoping, tube members and threadably received by two trunnions. The tubes are caused to telescope by using a common ratchet wrench to turn a hex nut provided at an end of that the drive screw. Both embodiments are capable of being reduced to a small package to facilitate storage and transportation when not in use.

22 Claims, 7 Drawing Sheets

U.S. PATENT DOCUMENTS

| | | |
|---|---|---|
| 4,715,480 A | 12/1987 | Anderson |
| 4,781,271 A | 11/1988 | Wokeck |
| 4,804,070 A | 2/1989 | Bohler |
| 4,828,076 A | 5/1989 | Fox |
| 4,833,442 A | 5/1989 | Von Heck |
| 4,875,813 A | 10/1989 | Moyer et al. |
| 4,917,219 A | 4/1990 | Henry |
| 4,934,489 A * | 6/1990 | Jackson ...................... 188/2 R |
| 5,104,170 A | 4/1992 | Rich |
| 5,137,121 A | 8/1992 | Leonard |
| 5,302,063 A | 4/1994 | Winsor |
| 5,316,421 A | 5/1994 | Bullock et al. |
| 5,392,880 A * | 2/1995 | Christian ...................... 188/32 |
| 5,427,210 A | 6/1995 | Willaford |
| 5,465,814 A | 11/1995 | Ziaylek |
| 5,613,385 A * | 3/1997 | Yamabe ...................... 70/226 |
| D385,526 S | 10/1997 | Hinkle |
| 5,689,981 A | 11/1997 | DeLuca et al. |
| D387,323 S | 12/1997 | Wilcox |
| 5,709,518 A | 1/1998 | Alexander et al. |
| 5,769,186 A | 6/1998 | Roberts |
| 5,927,443 A * | 7/1999 | Collins, Jr. ...................... 188/32 |
| 6,161,996 A * | 12/2000 | Bartlett ...................... 410/19 |

* cited by examiner

LOCKING WHEEL CHOCK APPARATUS FOR SINGLE TIRE

FIELD OF THE INVENTION

The present invention relates generally to a wheel chock apparatus, and more specifically to a locking apparatus that is especially suited for use with a single tire and wheel assembly included on single and dual axle vehicles such as tent trailers, travel trailers, boat trailers and the like.

BACKGROUND OF THE INVENTION

A variety of known wheel chock apparatuses have been used to impose some degree of immobilization upon a single wheel of a vehicle by positioning a pair of generally wedge-shaped chocks in contact with the leading and trailing circumferential rolling surface of the wheel, which is situated immediately fore and aft of the area where the wheel makes contact with the surface over which it would otherwise be expected to travel. One relatively recent locking wheel chock device employs a pair of conventional wedge shaped chocks that are connected together by a spacing bar affixed to the respective chocks, maintaining them in a facing arrangement and substantially in contact with both sides of a tire mounted on a wheel of a vehicle. Locking of the device is achieved by use of a conventional padlock, the U-shaped shank of which is received by mutually aligning holes provided in retaining arms that are also fastened to the respective chocks. A disadvantage associated with the construction of this device is that the retaining arms, even with the padlock secured in its intended position, will not be totally immovable relative to one another. This is so because the U-shape of the padlock shank will allow for a certain amount of play which, under certain conditions, can cause the chocks to loosen relative to the wheel and result in forward and backward rocking of the vehicle.

Another known wheel chock assembly includes a pair of wedge members positionable in spaced apart relation one to another and interconnected by a plain, straight bar. At one end, the bar is slidingly received by an aperture provided in a first of the wedge members, and at its other end, it is fixably attached to a second of the wedge members. A tab having an aperture is slidingly received by the bar and is disposed adjacent the first wedge member. Abutment of a portion of the tab against the first wedge member causes pivoting movement of the tab and locking engagement between an edge of the tab aperture and the bar, thereby preventing relative outward movement of the two wedge members. A potential disadvantage inherent with the design of this device is that the locking tab may become dislodged and thereby result in loosening of the wedge members.

Yet another known wheel chock assembly comprises a pair of reversible wheel chocks that are slidingly mounted upon a segmented spacer bar assembly. The wheel chocks may be oriented to engage opposing sides of a single wheel, and they each are maintained in a locked position relative to the spacer bar and the wheel by a thumb screw. While this wheel chock assembly overcomes the disadvantages associated with the previous two devices, it is generally bulky when assembled for use. The device can be reduced to a compact configuration for storage and transportation purposes; however, reassembly is required in order to put the device back into working condition.

Yet another wheel chock is known for engaging opposite sides of a wheel to prevent rolling in either direction by a pair of spaced wedge-like blocks that are secured together in pre-spaced relation by a hoop-like bar of resilient steel that operates to maintain the blocks in position while permitting flexing of the hoop to effect removal of the blocks from opposite sides of a wheel. The hoop-like bar acts to retain the blocks against the wheel. Like an earlier described device, this apparatus is susceptible to being inadvertently dislodged (the hoop-like bar protrudes a substantial horizontal distance outward from the wheel). Moreover, this apparatus cannot be reduced in size for easy storage and carrying.

Yet another known wheel chock mechanism includes a pair of chock body members secured together in spaced relationship with their inclined wheel-engaging portions opposed to each other, one of the body members being provided with an eccentric or cam movable relatively to that body member towards and away from the base of that member and formed with one or more vertically movable, floor-contacting pins, and means mounted on that body member for applying pressure to said pressure member so as to cause a reactionary force to be applied to the wheel through the wheel-engaging portions.

Lastly, an additional wheel chock apparatus that is known for use with a single tire and wheel assembly having a pair of oppositely facing, wedge-shaped chocks coupled by a horizontally sliding bar assembly connected at opposing ends to a vertically extending lateral face of each of the chocks. The wheel chock apparatus is adjustable; however, it does not appear to have any locking capability.

In view of the foregoing, it is evident that a need exists for a wheel chock apparatus for a single tire that can be easily and quickly locked against the tire in a more stable and secure manner than can be achieved with known wheel chock devices. It is further evident that a need exists for a wheel chock apparatus that can be readily reduced to a small, highly portable, easily storable size and that will require virtually no reassembly when the need arises to put it back into working order. Therefore, it is an object of the present invention to provide a new and useful wheel chock apparatus to fulfill these needs.

SUMMARY OF THE INVENTION

The present invention is a locking wheel chock apparatus for use with tent trailers, travel trailers and boat trailers having single or dual axles. The chock apparatus functions not only to hold a trailer in position, but also to limit the rocking or rotational movement of tire and wheel combination when a tent or travel trailer is used for camping, i.e., living conditions. The chock apparatus comprises a pair of metal chock assemblies which are movably linked together by a screw driven mechanism for tightening and loosening the chock assemblies about the tread area of a single tire and wheel assembly.

A first embodiment of the chock apparatus of the present invention uses right and left hand thread screws preferably having a thread size of 5/8"–11 UNC. It is envisioned that the right hand threaded screw would be located on the right hand of the chock apparatus so that a hand grip means or actuator, which is also included as part of the apparatus, would need to be rotated toward the apparatus operator in order for the chock assemblies to move laterally inboard towards each other. The hand grip preferably is an elongated metal bar having a square cross section and is used to tighten and loosen the chock assemblies relative to the tire and wheel assembly. The chock assemblies can be tightened by hand against the tire and wheel assembly and provide a certain level of stability according to the torque generated by the hands. Further tightening can be realized by applying to the hand grip an open end wrench or an adjustable wrench.

A second embodiment of the present invention, which accomplishes the same task as the first embodiment, does not include two oppositely threaded screws. Rather, a single threaded Acme drive screw is located inside of two longitudinally telescoping square tubes. The tubes are caused to telescope by using a ratchet wrench to turn a hex nut provided at an end of the screw. Chock flanges included in the chock assemblies are connected to threaded and stationary trunnions by way of a pivot point bolt. The pivot bolt connection, which is optional, enables the complete chock apparatus to be reduced to a small package when not in use.

DETAILED DESCRIPTION OF THE PREFERRED EMBODIMENTS

Figure 1:
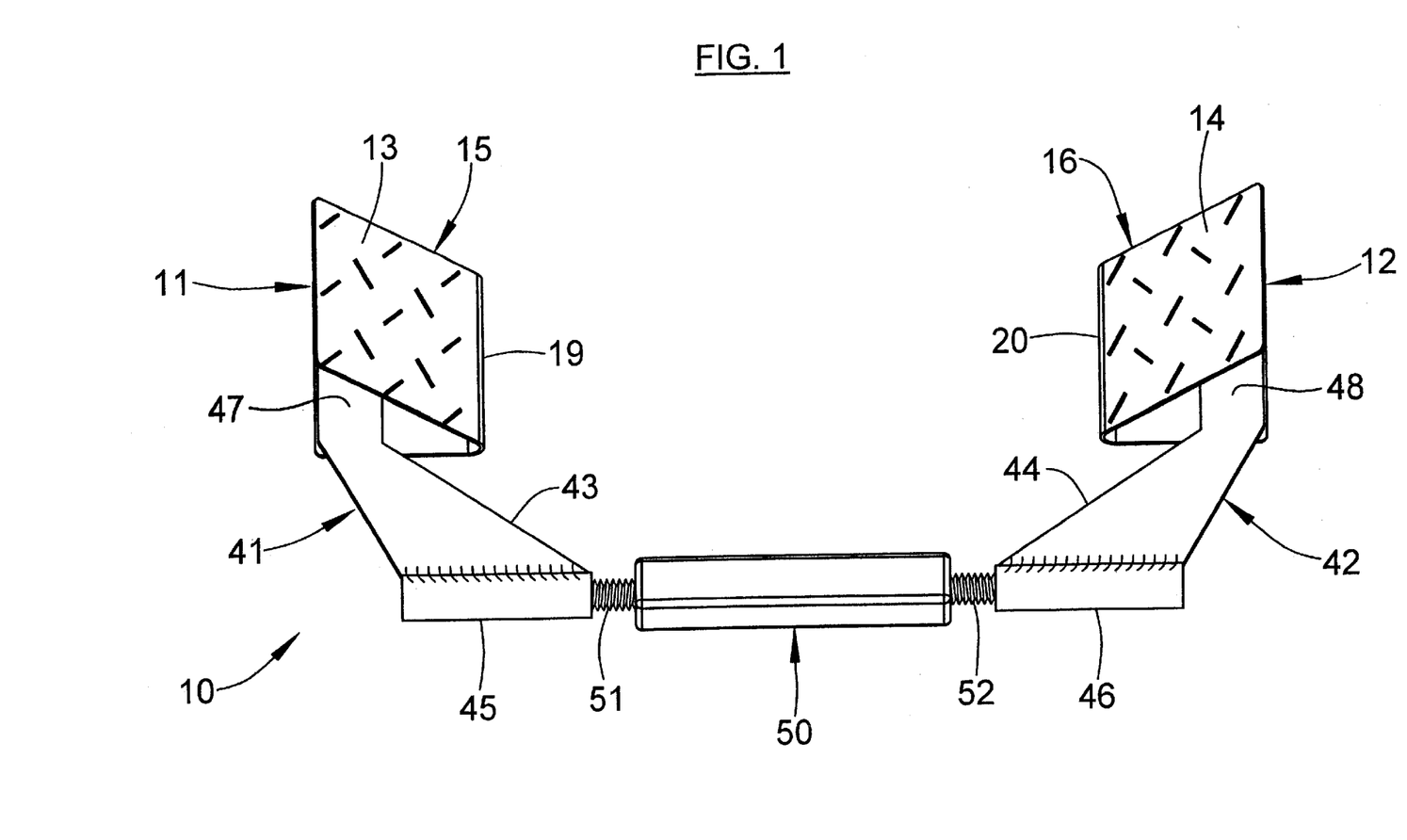
FIG. 1 shows a top view of a first embodiment of the present invention.
Figure 3:
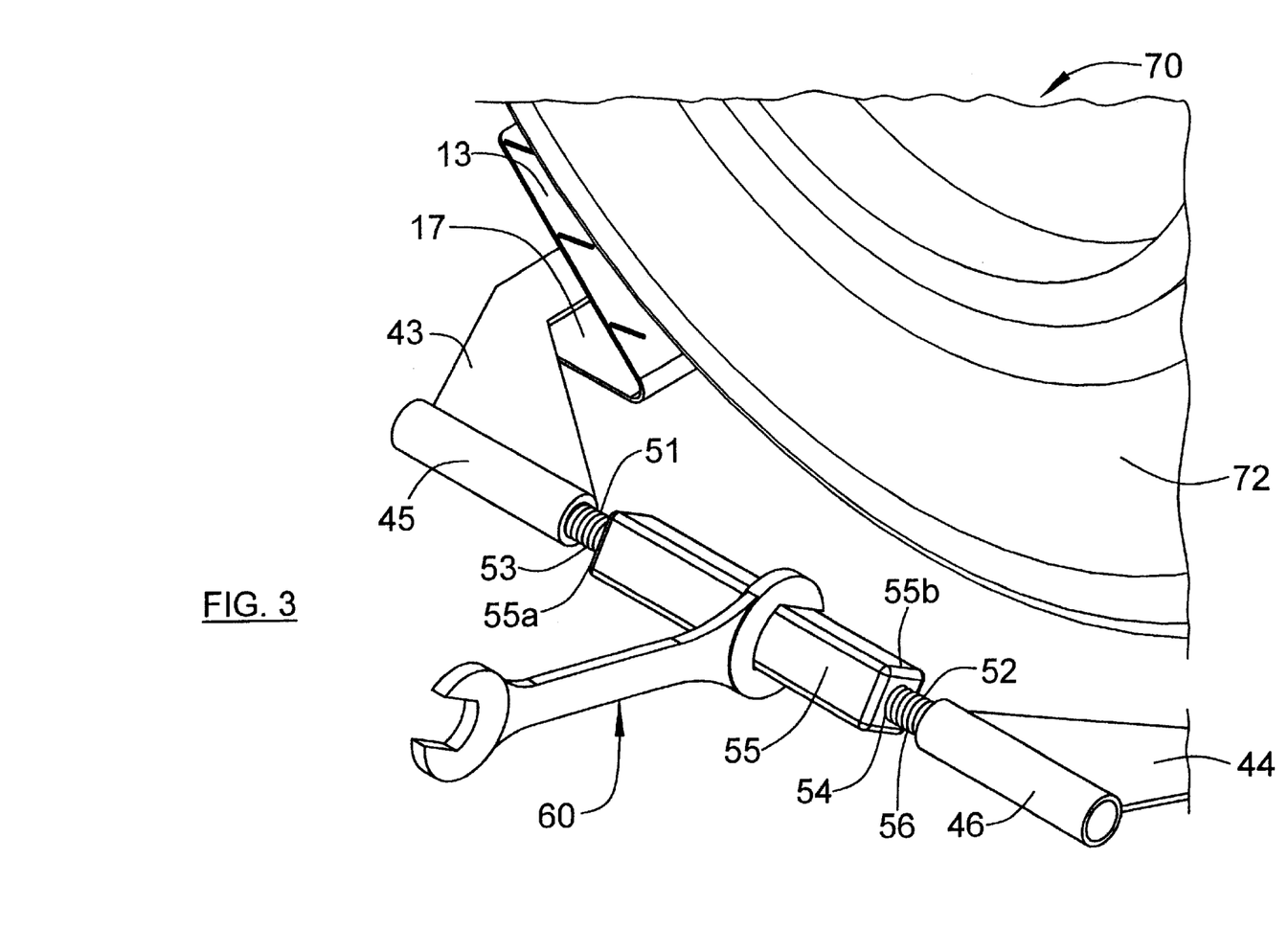
FIG. 3 shows an enlarged side view of the first embodiment of the present invention in use with a single tire and wheel assembly.

A locking wheel chock apparatus in accordance with a first preferred embodiment of the present invention is indicated in FIG. 1 by the reference numeral 10. The apparatus 10 is generally comprised of a first metal chock assembly 11 and a second metal chock assembly 12, both of which are movably linked together by a screw driven mechanism 50 for tightening and loosening the first and second chock assemblies 11 and 12 about the tread area of a single tire and wheel assembly 70 such as that which is indicated in FIG. 3. As shown in FIG. 1, the first and second chock assemblies 11 and 12 are situated respectively at first and second opposing ends of the mechanism 50 and are oriented relative to one another in a spatially separated manner such that an inclined region 13 of the first chock assembly 11 and an inclined region 14 of the second chock assembly 12 face each other.

Figure 2:
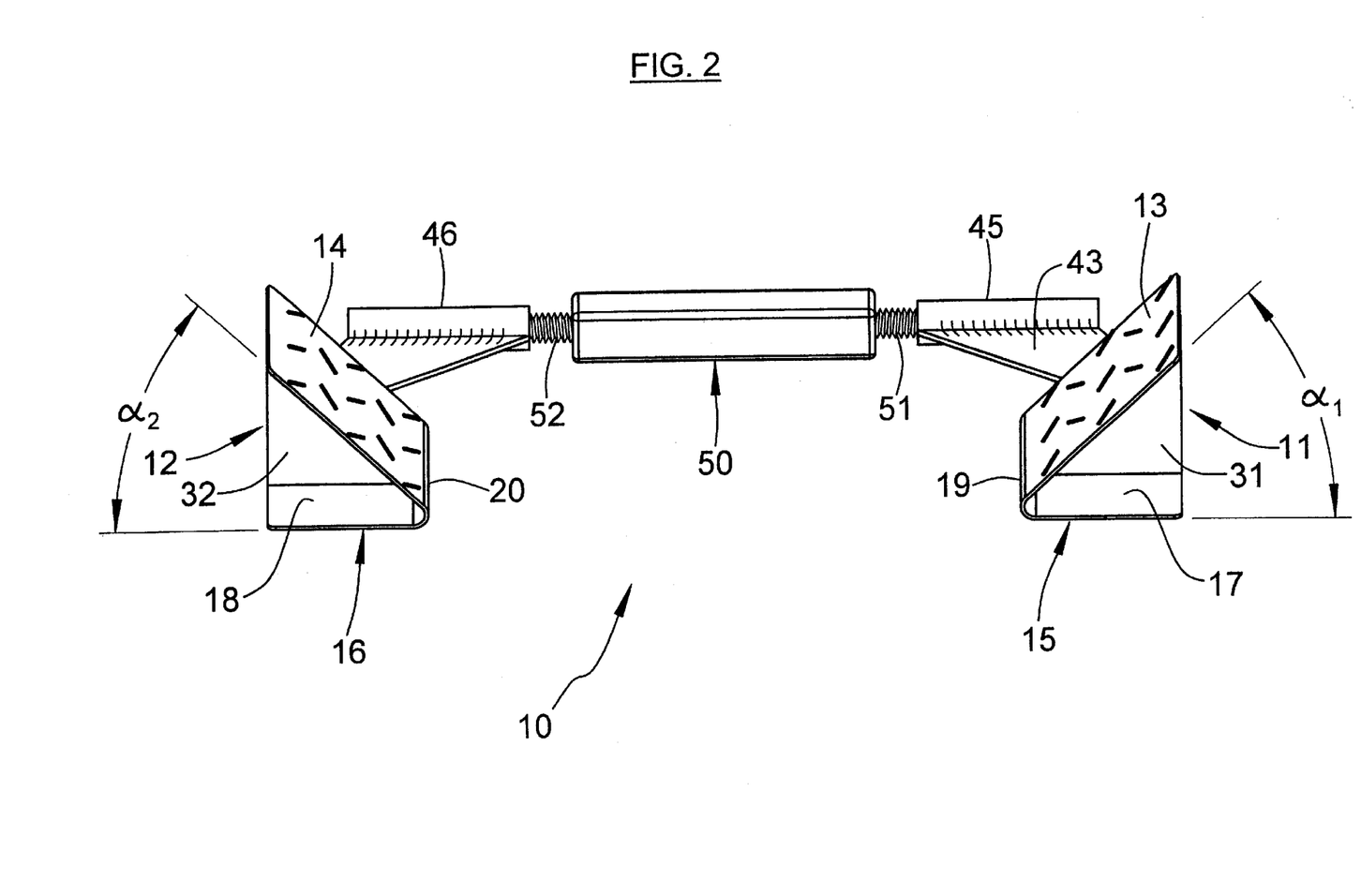
FIG. 2 shows a side view of the first embodiment of the present invention.

As may be most clearly seen by reference to FIG. 2, the first chock assembly 11 is comprised of a wedge-shaped plate 15 which preferably is fabricated of sheet metal and is bent by known methods into an angular form including the inclined region 13, horizontal region 17 and rounded region 19 lying intermediate the regions 13 and 15 and defining a nose-like point for the plate 15. It further will be noted that the plate 15 is bent so as to form an acute angle $\alpha_1$ between the regions 13 and 15. The first chock assembly 11 is further comprised of a vertically oriented reinforcing web 31 which is a triangularly shaped piece of sheet metal cut to conform to the contour defined by the interior surface of the plate 15 and secured thereto by known fastening means such as welding. Also included in the first chock assembly 11 is a drive connector arm 41 that is employed to join the chock assembly 11 to the drive mechanism 50. The drive connector arm 41 includes a central, elongated plate member 43. The plate member 43 has a shape resembling a triangle wherein one of the angles included between two of the sides of the triangle is an obtuse angle. One of the edges of the plate member 43, that defines the obtuse angle is adjoined by and rigidly connected to a tubular member 45. The connection between the plate member 43 and tubular member 45 is effected by welding or any other suitable technique, and as is most clearly shown in FIGS. 1 and 3, the connection is made so that the edge of the plate member 43 extends longitudinally along the outer surface of the tubular member 45. The internal surface of the tubular member 45 is provided with threading. For reasons that will be hereinafter further explained, the threading preferably will be of the left hand type. The drive connector arm 41 further includes a narrow tab member 47 that is bent inwardly relative to the plane of the plate member 43 and toward the reinforcing web 31. The narrow tab member 47 is securely affixed to the inside flat surface of the web 31 by welding or any other suitable fastening method.

While the immediately foregoing discussion focused on the structure of the first chock assembly 11, it should be noted that the second chock assembly 12 has a structure that essentially mirrors that of the first chock assembly 11. More specifically, the second chock assembly includes: a wedge-shaped plate 16; the inclined region 14, horizontal region 18 and rounded region 20 lying intermediate the regions 14 and 18 and defining nose-like point for the plate 16; a vertically oriented reinforcing web 32; and a drive connector arm 42 having a central, elongated plate member 44, a tubular member 46, and a narrow tab member 48. All of the just mentioned components of the second chock assembly 12 are fabricated of the same materials and assembled using the same techniques described for corresponding components of the first chock assembly 11. Additionally, the acute angle $\alpha_2$ defined by the wedge-shaped plate 16 is equal in magnitude but opposite in direction to angle $\alpha_1$. The tubular member 46 differs from the tubular member 45, however, in that the internal surface of the tubular member 46 is provided with right hand threading.

As most clearly shown in FIG. 3, the drive mechanism 50 is comprised of a centrally located hand grip means 55 which preferably is an elongated metal bar having a square cross section. Additionally, the drive mechanism 50 includes a first drive rod 51 and a second drive rod 52. The first drive rod 51 is received by a first, longitudinally extending central bore (not shown) provided in a first end 55a of the hand grip 55, and the second drive rod 52 is similarly received by a second, longitudinally extending central bore 54 provided in a second end 55b of the hand grip 55. Both of the drive rods 51 and 52 are immovably secured in the bores by welding or other suitable means. The drive rod 51 is provided with a threaded region 53 along its outer surface. The threaded region 53 is comprised of left hand threads which are matingly compatible with the threads provided on the internal surface of the tubular member 45. The drive rod 52 also provided with a threaded region 56 along its outer surface, which region 56 is comprised of right hand threads which are matingly compatible with the threads provide internally of the tubular member 46. As also indicated in FIG. 3, the outermost end of the first drive rod 51 is threadably received by the internally threaded orifice of the first tubular member 45, and the outermost end of the second drive rod 52 is threadably received by the internally threaded orifice of the second tubular member 46. It should be noted that the preferred thread size for all of the aforementioned threaded regions is ⅝"-11 UNC. Other thread sizes may be employed with satisfactory results, however. Therefore, other thread sizes are intended to be within the scope of the invention.

The wheel chock apparatus 10 will be used with a single tire and wheel assembly as shown in FIG. 3. The inclined region 13 of the first chock assembly 11 will be placed beneath the generally downwardly facing portion of the tread of the tire 72, that lies to the left of the area where the tire 72 makes contact with an underlying support surface such as pavement. The inclined region 14 of the second chock assembly 12 will be placed under the generally downwardly facing portion of the tread of the tire 72, that lies to the right of the area where the tire 72 makes contact with the underlying support surface. The first and second chock assemblies 11 and 12 will then be drawn laterally inward toward the tread of the tire 72 by rotating the hand grip 55 about its longitudinal axis in a direction that is outwardly away from the outboard sidewall of the tire 72. Initially, the desired inward movement of the chock assemblies 11 and 12 may be produced by turning the grip 55 with direct hand contact until the inclined regions 13 and 14 make direct contact with the aforementioned downwardly directed tread areas of the tire 72. Additional inward movement and tightening can be accomplished by application of a common wrench 60 to the grip 55 as shown in FIG. 3. While use of an adjustable wrench is depicted in FIG. 3, a non-adjustable open end wrench of appropriate size may just as easily be employed with equal results.

Figure 4:
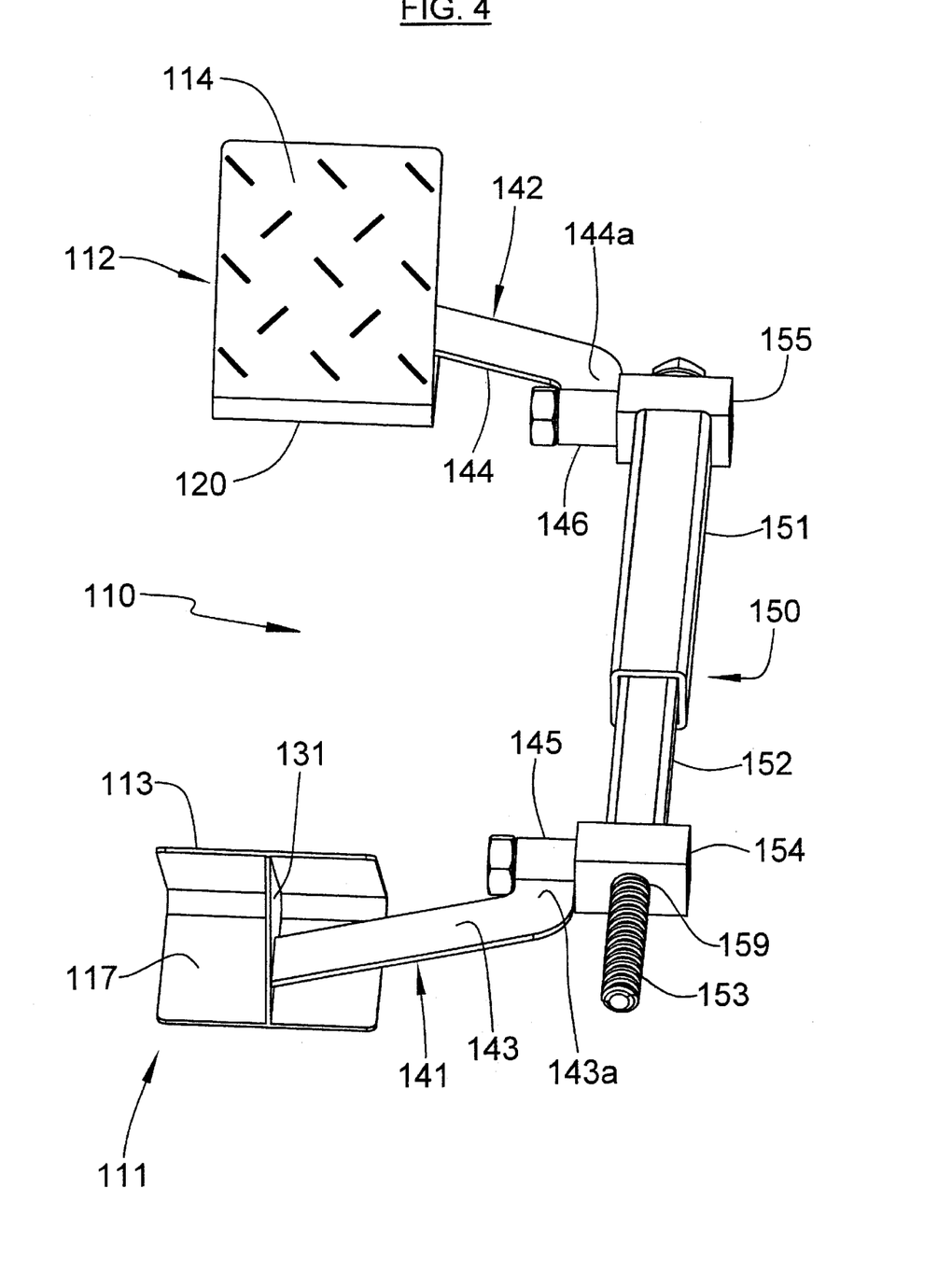
FIG. 4 shows a top view of a second embodiment of the present invention.

A locking wheel chock in accordance with a second preferred embodiment of the present invention is indicated in FIG. 4 by the reference numeral 110. Like the first wheel chock apparatus 10, the second apparatus 110 is generally comprised of a first metal chock assembly 111 and a second metal chock assembly 112, both of which are movably linked together by a screw driven mechanism 150 for tightening and loosening the first and second chock assemblies 111 and 112 about the tread area of a single tire and wheel assembly 70 such as that which is indicated in FIG. 6.

Figure 5:
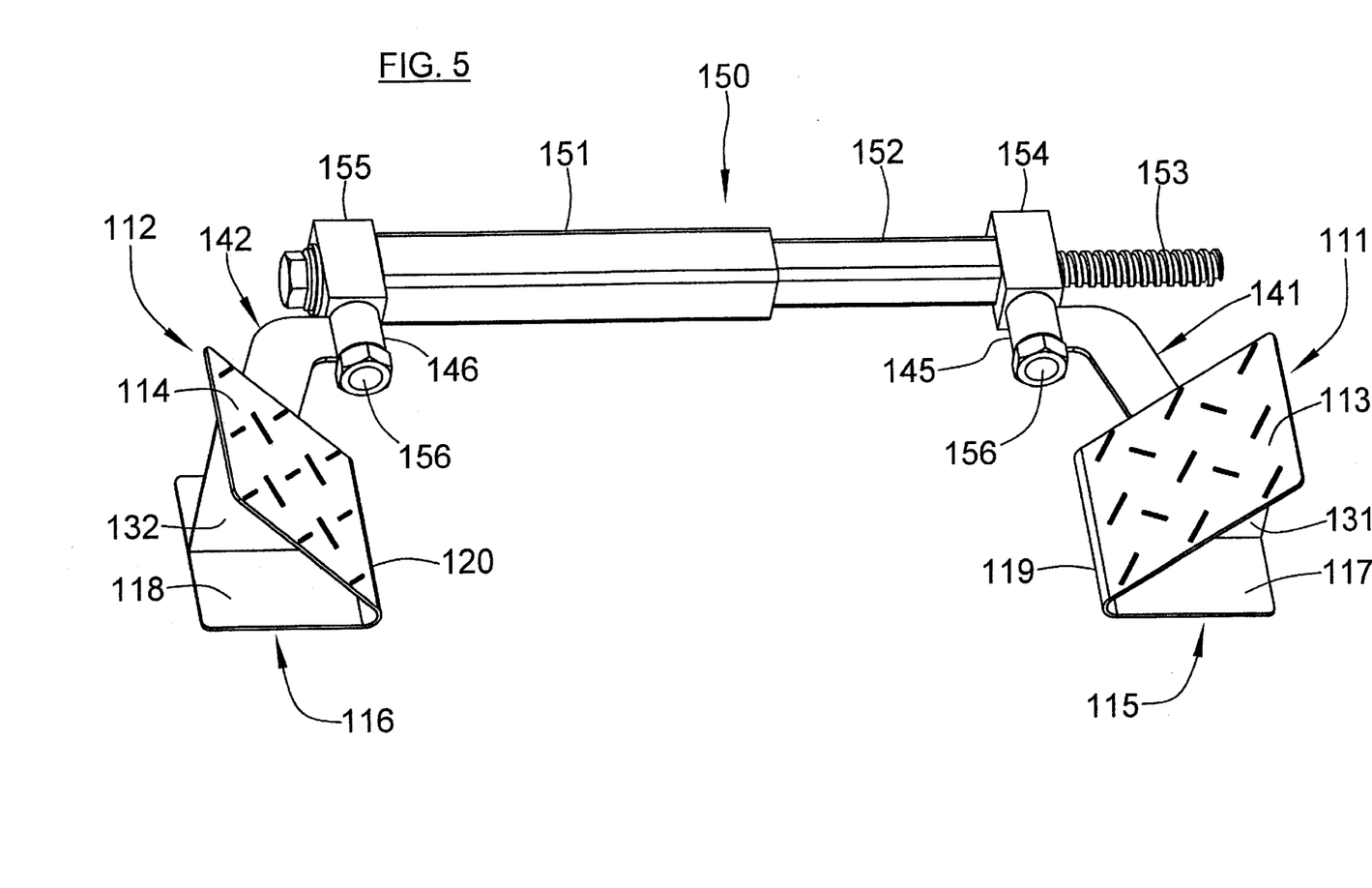
FIG. 5 shows a side view of the second embodiment of the present invention.

As may be most clearly seen by reference to FIG. 5, the first chock assembly 111 is comprised of a wedge-shaped plate 115 which preferably is fabricated of sheet metal and is bent by known methods into an angular form including an inclined region 113, a horizontal region 117 and a rounded region 119 lying intermediate the regions 113 and 15 and defining a nose-like point for the plate 115. It further will be noted that the plate 115 is bent so as to form an acute angle $\alpha_1$ between the regions 113 and 117. The first chock assembly 111 is further comprised of a vertically oriented reinforcing web 131 which is a triangularly shaped piece of sheet metal cut to conform to the contour defined by the interior surface of the plate 115 and secured thereto by known fastening means such as welding. Also included in the first chock assembly 111 is a drive connector arm 141 that is employed to join the chock assembly 111 to the drive mechanism 150. The drive connector arm 141 includes an elongated, bar-like main body 143 which has an abbreviated, inwardly curved portion 143a at one of its ends. The drive connector arm 141 further includes a pipe-like chock flange 145 which, as is most clearly shown in FIG. 6, is rigidly fastened to the end of curved portion 143a by means of a weld or other suitable joining means.

The second chock assembly 112 includes a structure that is reflective of that of the first chock assembly 111. More precisely, the second chock assembly is comprised of: a wedge-shaped plate 116; an inclined region 114, a horizontal region 118 and a rounded region 120 lying intermediate the regions 114 and 118 and defining nose-like point for the plate 116; a vertically oriented reinforcing web 132; and a drive connector arm 142 having an elongated, bar-like main body 144 which has an abbreviated, inwardly curved portion 144a at one of its ends; and a pipe-like chock flange 146 rigidly fastened to the end of curved portion 144a by means of a weld or other suitable joining means.

Figure 6:
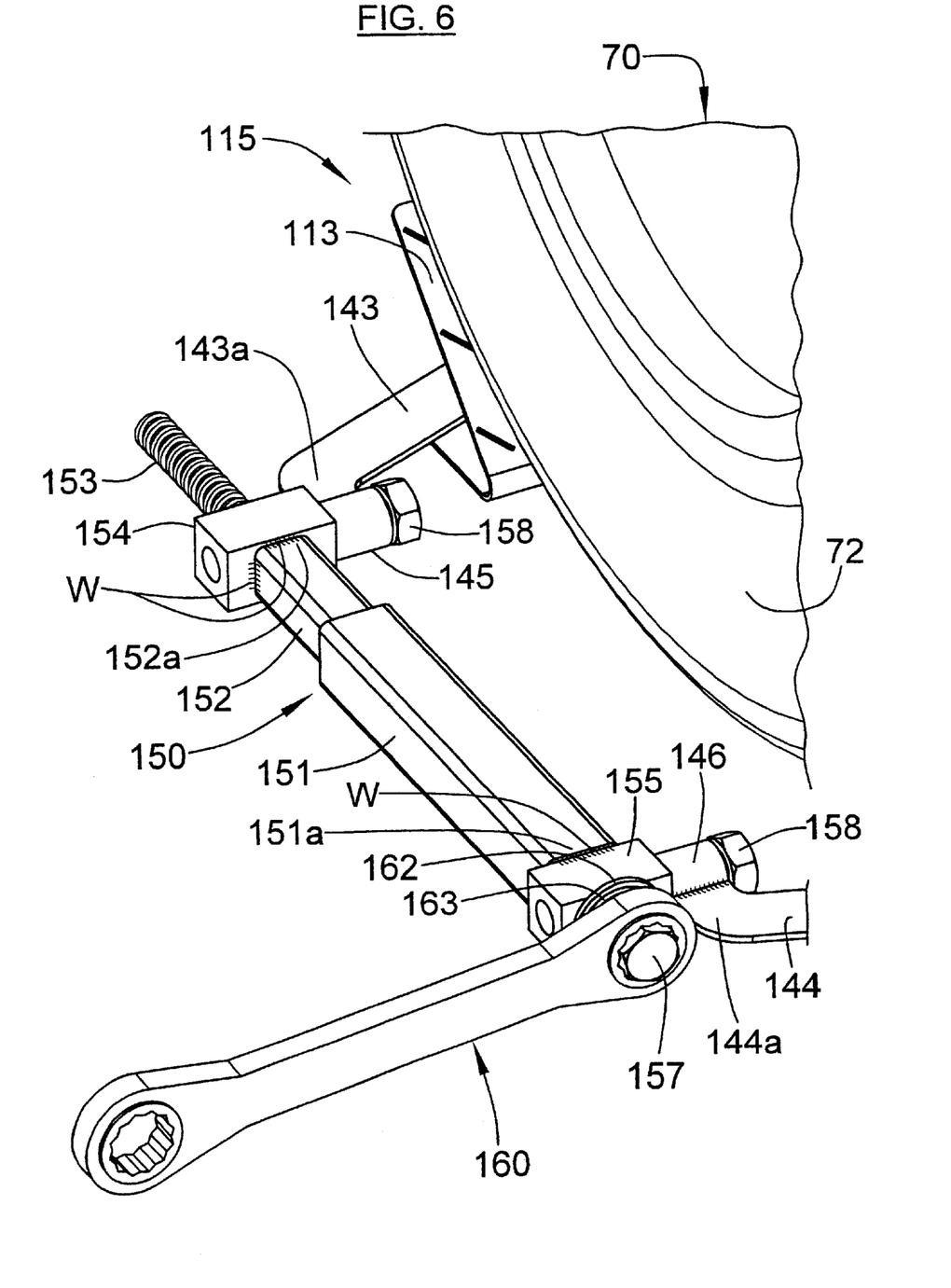
FIG. 6 shows an enlarged side view of the second embodiment of the present invention in use with a single tire and wheel assembly.

As shown in FIG. 4, the screw-driven mechanism 150 is substantially comprised of: a first tubular body member 151; a second tubular body member 152; a single threaded Acme drive screw 153; a movable trunnion 154; a stationary trunnion 155; a pair of pivot bolts 156 (See FIG. 5); and a turning hex nut 157 (See FIG. 6). As may be most clearly seen in FIG. 6, the first tubular body member 151 and the second tubular body member 152 have square cross sections which differ dimensionally so that the second tubular body member 152 may be slidably received within the inside cavity of the tubular body member 151. The drive screw 153, which has a length that exceeds the combined length of the first and second tubular body members 151 and 152, is longitudinally received within the inside cavity of each of the body members 151 and 152. The movable trunnion 154 is rigidly secured at one of its lateral sides to the outermost end 152a of the second body member 152, and the stationary trunnion 155 is fastened at one of its lateral sides to the outermost end 151a of the body member 151. The trunnions 154 and 155 preferably are secured to the body member ends 152a and 151a by way of conventional welds W provided along adjacent portions of the respective trunnion lateral surfaces and the body member ends.

As indicated in FIG. 4, the movable trunnion 154 and the stationary trunnion 155 are each provided with a transverse bore 159 (shown in trunnion 154 only) which is suitably dimensioned and threaded to receive the opposing ends of the drive screw 153. FIG. 5 indicates that one of the two pivot bolts 156 extends horizontally outward from one of the transversely oriented ends of the movable trunnion 154, while the other on the pivot bolts 156 similarly extends horizontally outward from one of the transversely oriented ends of the stationary trunnion 155. The pivot bolts 156 are dimensioned such that one each of them are loosely received within the longitudinally extending bore provided in the pipe-like chock flanges 145 and 146. The pivot bolts 156 are further dimensioned so that when they are so positioned within the flanges 145 and 146, they also will protrude some distance beyond the outer rim portion of flanges 145 and 146. The protruding length of each of the bolts 156 preferably will be threaded and receive the nut fasteners 158 to ensure that the flanges 145 and 146 are retained axially on that the bolts 156. That the nut fasteners 158 may be rendered rotationally immovable relative to that the bolts 156 by providing a quantity of weld material that bridges each fastener 158 and that the bolt 156 by which it has been received.

That the turning hex nut 157 is coaxially secured by known means to a protruding portion of that the end of that the drive screw 153 that is threadably received by that the stationary trunnion 155. That the nut 157 provides that the necessary structure to removably couple a known wrench implement 160 to that the drive mechanism 150 and to operate that the chock apparatus 110 in a manner that will be hereinafter explained. It should be note that a pair of annular washers 162 and 163 also are included among that the components of that the drive mechanism 150. That the annular washers 162 and 163 receive that the drive screw As indicated in FIG. 4, the movable trunnion 154 and the stationary trunnion 155 are each provided with a transverse bore 159 (shown in trunnion 154 only) which is suitably dimensioned and threaded to receive the opposing ends of the drive screw 153. FIG. 5 indicates that one of the two pivot bolts 156 extends horizontally outward from one of the transversely oriented ends of the movable trunnion 154, while the other of the pivot bolts 156 similarly extends horizontally outward from one of the transversely oriented ends of the stationary trunnion 155. The pivot bolts 156 are dimensioned such that each one of them are loosely received within the longitudinally extending bore provided in the pipe-like chock flanges 145 and 146. The pivot bolts 156 are further dimensioned so that when they are so positioned within the flanges 145 and 146, they also will protrude some distance beyond the outer rim portion of flanges 145 and 146. The protruding length of each of the bolts 156 preferably will be threaded and receive the nut fasteners 158 to ensure that the flanges 145 and 146 are retained axially on the bolts 156. The nut fasteners 158 may be rendered rotationally immovable relative to the bolts 156 by providing a quantity of weld material that bridges each fastener 158 and the bolt 156 by which it has been received.

The turning hex nut 157 is coaxially secured by known means to a protruding portion of the end of the drive screw 153 that is threadably received by the stationary trunnion 155. The nut 157 provides the necessary structure to removably couple a known wrench implement 160 to the drive mechanism 150 and to operate the chock apparatus 110 in a manner that will be hereinafter explained. It should be note that a pair of annular washers 162 and 163 also are included among the components of the drive mechanism 150. The annular washers 162 and 163 receive the drive screw 153 and are situated intermediate of the outermost lateral face of the stationary trunnion 155 and hex nut 157.

The wheel chock apparatus 110 will be used with a single tire and wheel assembly 70 as shown in FIG. 6. The inclined region 113 of the first chock assembly 111 will be placed beneath the generally downwardly facing portion of the tread of the tire 72, that lies to the left of the area where the tire 72 makes contact with an underlying support surface such as pavement. The inclined region 114 of the second chock assembly 112 will be placed under the generally downwardly facing portion of the tread of the tire 72, that lies to the right of the area where the tire 72 makes contact with the underlying support surface. The first and second chock assemblies 111 and 112 will then be drawn laterally inward toward the tread of the tire 72 by rotating the drive screw 153 about its longitudinal axis in a direction that will cause the movable trunnion 154 to advance laterally along the screw 153 toward the inner end of the tubular body member 151. (Rotation of the drive screw 153 is caused by attaching the wrench 160, which preferably will be a ratchet wrench, to the turning hex nut 157 and imparting the necessary rotational force thereto.) As the movable trunnion 154 moves toward the tubular body member 151, the tubular body member 152 moves further into the body member 151 in a telescoping manner, and the first wheel chock assembly 111 is drawn inwardly toward the tire 72. As translation of the movable trunnion 154 continues toward the body member 151, chock assembly 111 continues to advance toward the tire 72 until the inclined region 113 of the wedge-shaped plate 115 makes tangential contact with the generally downwardly facing portion of the tread of the tire 72, that lies to the left of the area where the tire 72 makes contact with the underlying support surface. The drive screw will continue to be rotated until the inclined region 114 of the second chock assembly 112 similarly makes contact with the generally downwardly facing portion of the tread of the tire 72, that lies to the right of the area where the tire 72 makes contact with the underlying support surface. If desired, additional inward movement and tightening of the chock assemblies 111 and 112 against the tire tread areas can be obtained by further rotation of the drive screw 153. Loosening of the chock assemblies will of course be effected by causing the drive screw 153 to be rotated in the direction opposite to that which caused tightening movement.

Figure 7:
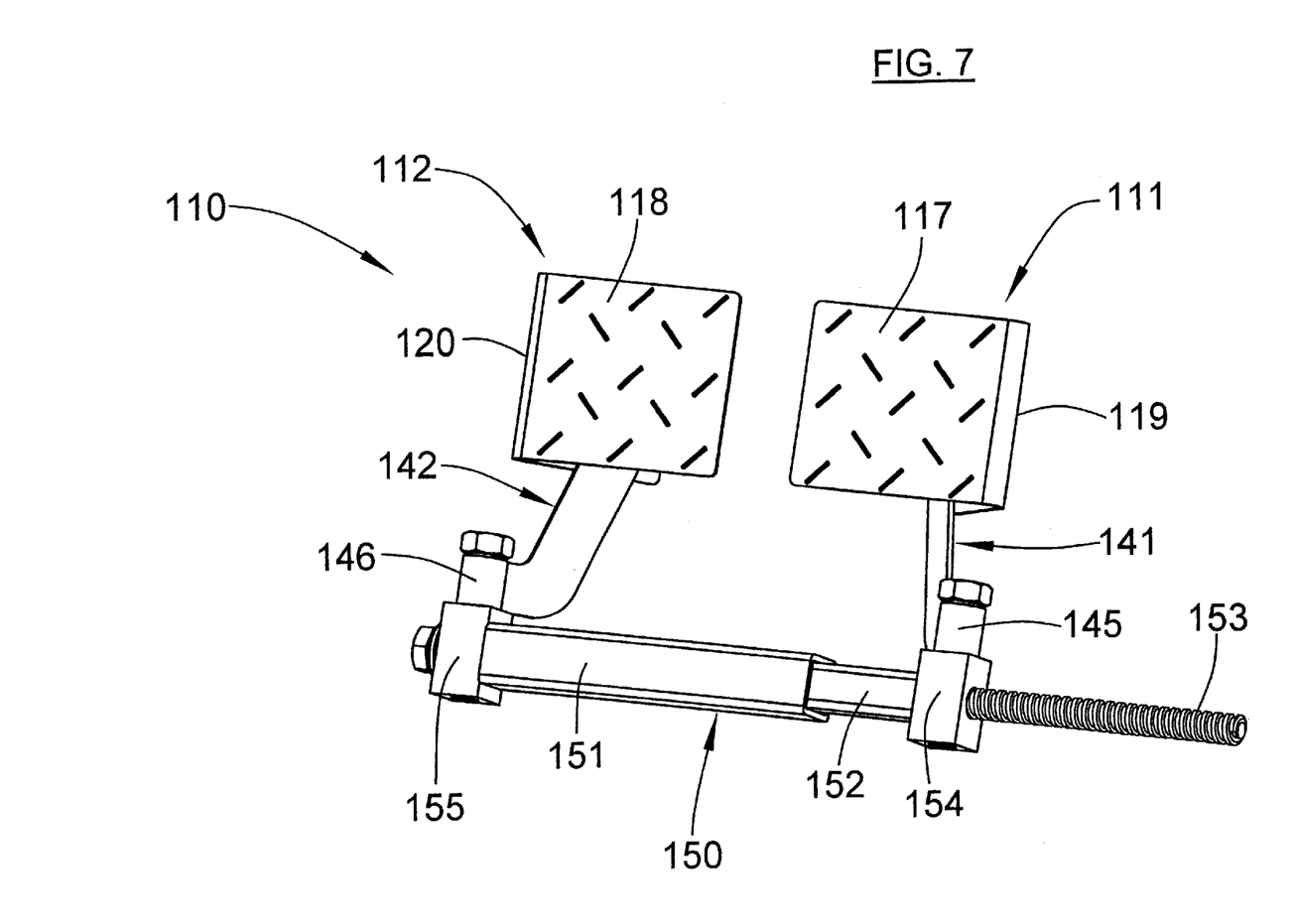
FIG. 7 shows a top view of the second embodiment of the present invention in a compact state.

FIG. 7 provides an illustration of how the wheel chock apparatus 110 of the present invention will appear in a compact configuration when it is not needed for use. As previously indicated, the pivoting bolts 156 are loosely received within the longitudinally extending bore provided in the pipe-like chock flanges 145 and 146. This loose reception makes it possible for each of the wheel chock assemblies 111 and 112 to be rotatably moved about their respective pivoting bolts 156. In the case of the chock assembly 111, it may be rotated in an upwardly counterclockwise direction relative to the bolt 156 and into a position that is offset closer to the transverse center line of the telescoping combination of the main body members 151 and 152. It will be noted that when the chock assembly 111 is in the described position, the horizontal region 117 of the wedge-shaped plate 115 will be facing in a direction that is generally upward. In a similar fashion the chock assembly 112 may be rotated in an upwardly clockwise direction with respect to the bolt 156 and into a position that is oppositely offset closer to the transverse center line of the telescoping combination of the main body members 151 and 152. In such position, the horizontal region 118 of the wedge shaped plate 116 will be facing in a generally upward direction, and both of the chock assemblies 111 and 112 will lie closer to one another than when the apparatus 110 is in any of its in use configurations, i.e., the configurations shown in FIGS. 4, 5 or 6.

The wheel chock apparatus 10 of the present invention also has a capacity for attaining a smaller-sized arrangement when it is not in use; however, such capacity is more limited in scope than that of the chock apparatus 110. By referring to FIG. 1, it should be readily apparent that neither the chock assembly 11 nor the chock assembly 12 are capable of rotating inwardly toward the transverse center line of the assembly 10 as the chock assemblies 111 and 112 of the apparatus 110. In spite of this, the assemblies 11 and 12 are capable of being translated laterally inward along the first drive rod 51 and the second drive rod 52 so that the linear distance between the rounded regions 19 and 20 becomes smaller and the overall length of the apparatus becomes minimal.

While the preferred embodiments of the invention have been described above, it will be recognized and understood that various modifications may be made therein and that the appended claims are intended to cover all such modifications which may fall within the spirit and scope of the invention.

What is claimed is:

1. A locking wheel chock apparatus for use with a single tire and wheel assembly, comprising:
   a drive means for tightening and loosening said apparatus about the single tire and wheel assembly, said drive means consisting of a single rotary elongated drive mechanism including: an elongated hand grip means having a first hand grip end and a second hand grip end; a first drive rod connected to said hand grip means at said first hand grip end; and a second drive rod connected to said hand grip at said second hand grip end;
   a first chock assembly connected to said drive means; and
   a second chock assembly also connected to said drive means,
   said hand grip means is a bar having a polygonal cross section, said first hand grip end is provided with an axial bore for receiving an inner end of said first drive rod, and said second hand grip end is provided with an axial bore for receiving an inner end of said second drive rod.

2. A wheel chock apparatus as claimed in claim 1, wherein said first drive rod has a threaded region extending along its outer surface.

3. A wheel chock apparatus as claimed in claim 1, wherein said second drive rod has a threaded region extending along its outer surface.

4. A wheel chock apparatus as claimed in claim 1, wherein said first drive rod and said second drive rod have a threaded region extending along their outer surface.

5. A wheel chock apparatus as claimed in claim 4, wherein said threaded region extending along the outer surface of said first drive rod is comprised of left hand threads and said threaded region extending along that the outer surface of said second drive rod is comprised of right hand threads.

6. A wheel chock apparatus as claimed in claim 5, wherein said first chock assembly is comprised of:
   a first chock assembly plate;
   a first chock assembly reinforcing web connected to said first chock assembly plate; and
   a first chock assembly drive connector arm connected to said first chock assembly reinforcing web and to said first drive rod; and
wherein said second chock assembly is comprised of:
   a second chock assembly plate;
   a second chock assembly reinforcing web connected to said second chock assembly plate; and
   a second chock assembly drive connector arm connected to said second chock assembly reinforcing web and to said second drive rod.

7. A locking wheel chock apparatus for use with a single tire and wheel assembly, comprising:
   a drive means for tightening and loosening said apparatus about the single tire and wheel assembly, said drive means is an elongated drive mechanism including: an elongated hand grip means having a first hand grip end and a second hand grip end; a first drive rod connected to said hand grip means at said first hand grip end; and a second drive rod connected to said hand grip at said second hand grip end;
   a first chock assembly connected to said drive means; and
   a second chock assembly also connected to said drive means,
   said hand grip means is a bar having a polygonal cross section, said first hand grip end is provided with an axial bore for receiving an inner end of said first drive rod, and said second hand grip end is provided with an axial bore for receiving an inner end of said second drive rod, wherein said first drive rod and said second drive rod have a threaded region extending along their outer surface; said threaded region extending along the outer surface of said first drive rod is comprised of left hand threads and said threaded region extending along that the outer surface of said second drive rod is comprised of right hand threads, said first chock assembly is comprised of: a first chock assembly plate; a first chock assembly reinforcing web connected to said first chock assembly plate; and a first chock assembly drive connector arm connected to said first chock assembly reinforcing web and to said first drive rod, said second chock assembly is comprised of: a second chock assembly plate; a second chock assembly reinforcing web connected to said second chock assembly plate; and a second chock assembly drive connector arm connected to said second chock assembly reinforcing web and to said second drive rod, said first chock assembly drive connector arm further includes a first chock assembly drive connector arm tab member for connecting a first end of said first chock assembly drive connector arm to said first chock assembly reinforcing web and a first chock assembly drive connector arm tubular member for connecting a second end of said first chock assembly drive connector arm to said first drive rod and wherein said second chock assembly drive connector arm further includes a second chock assembly drive connector arm tab member for connecting a first end of said second chock assembly drive connector arm to said second chock assembly reinforcing web and a second chock assembly drive connector arm tubular member for connecting a second end of said second chock assembly drive connector arm to said second drive rod.

8. A wheel chock apparatus as claimed in claim 7, wherein that the internal surface of said first chock assembly drive connector arm tubular member is provided with a threaded region comprised of left hand threads and threadably receives said first drive rod, and wherein that the internal surface of said second chock assembly drive connector arm tubular member is provided with a threaded region comprised of right hand threads and threadably receives said second drive rod.

9. A locking wheel chock apparatus for use with a single tire and wheel assembly, comprising:
   a drive means for tightening and loosening said apparatus;
   a first chock assembly connected to said drive means; and
   a second chock assembly also connected to said drive means;
   said drive means is an elongated drive mechanism including: a first tubular body member; a second tubular body member slidably received within an inside cavity defined by said first tubular body member, said first tubular body member and said second tubular body member are metal and have a square cross section; an elongated drive screw received within said inside cavity defined by said first tubular body member and within an inside cavity defined by said second tubular body member, said elongated drive screw is a metal rod having a threaded region extending along its outer surface, said threaded region including a single threaded Acme thread profile; a stationary trunnion connected to an outermost end of said first tubular body member; a movable trunnion connected to an outermost end of said second tubular body member; and a means secured to said drive screw for imparting a rotation causing force to said drive screw,
   said stationary trunnion is provided with a transverse bore for receiving a first end of said elongated drive screw.

10. A locking wheel chock apparatus for use with a single tire and wheel assembly, comprising:
   a drive means for tightening and loosening said apparatus;
   a first chock assembly connected to said drive means; and
   a second chock assembly also connected to said drive means;
   said drive means is an elongated drive mechanism including: and a first tubular body member; a second tubular body member; an elongated drive screw received within said inside cavity defined by said first tubular body member and within an inside cavity defined by said second tubular body member; a stationary trunnion connected to an outermost end of said first tubular body member; a movable trunnion connected to an outermost end of said second tubular body member; and a means secured to said drive screw for imparting a rotation causing force to said drive screw, wherein said first tubular body member and said second tubular body member are metal and have a square cross section, said elongated drive screw is a metal rod having a threaded region extending along its outer surface, said threaded region including a single threaded Acme thread profile, said movable trunnion is provided with a transverse bore including a threaded region therethrough and for threadably receiving a second end of said elongated drive screw, said second end of said elongated drive screw including said single threaded Acme thread profile.

11. A wheel chock apparatus as claimed in claim 10, wherein said first chock assembly is comprised of:
  a first chock assembly plate;
  a first chock assembly reinforcing web connected to said first chock assembly plate; and
  a first chock assembly drive connector arm connected to said first chock assembly reinforcing web and to said second tubular body member and
wherein said second chock assembly is comprised of:
  a second chock assembly plate;
  a second chock assembly reinforcing web connected to said second chock assembly plate; and
  a second chock assembly drive connector arm connected to said second chock assembly reinforcing web and to said first tubular body member.

12. A wheel chock apparatus as claimed in claim 11, wherein said first chock assembly reinforcing web and said second chock assembly reinforcing web are triangularly shaped.

13. The locking wheel chock apparatus according to claim 10, wherein the first chock assembly is connected to the stationary trunnion and the second chock assembly is connected to the movable trunnion.

14. A locking wheel chock apparatus for use with a single tire and wheel assembly, comprising:
  a drive means for tightening and loosening said apparatus;
  a first chock assembly connected to said drive means; and
  a second chock assembly also connected to said drive means;
  said drive means is an elongated drive mechanism including: a first tubular body member; a second tubular body member slidably received within an inside cavity defined by said first tubular body member; an elongated drive screw received within said inside cavity defined by said first tubular body member and within an inside cavity defined by said second tubular body member; a stationary trunnion connected to an outermost end of said first tubular body member; a movable trunnion connected to an outermost end of said second tubular body member; and a means secured to said drive screw for imparting a rotation causing force to said drive screw,
  said first chock assembly is comprised of: a first chock assembly plate; a first chock assembly reinforcing web connected to said first chock assembly plate; and a first chock assembly drive connector arm connected to said first chock assembly reinforcing web and to said second tubular body member;
  said second chock assembly is comprised of: a second chock assembly plate; a second chock assembly reinforcing web connected to said second chock assembly plate; and a second chock assembly drive connector arm connected to said second chock assembly reinforcing web and to said first tubular body member;
  said stationary trunnion is provided with a stationary trunnion pivot bolt extending horizontally outward from a transverse end of said stationary trunnion, and wherein said movable trunnion is provided with a movable trunnion pivot bolt extending horizontally outward from a transverse end of said movable trunnion.

15. A wheel chock apparatus as claimed in claim 14, wherein said first chock assembly drive connector arm further includes a first chock assembly drive connector arm flange that receives said movable trunnion pivot bolt and said second chock assembly drive connector arm further includes a second chock assembly drive connector arm flange that receives said stationary trunnion pivot bolt.

16. A wheel chock apparatus as claimed in claim 15, wherein said first chock assembly drive connector arm flange and said second chock assembly drive connector arm flange are retained on said trunnion pivot bolts by a nut fastener.

17. A wheel chock apparatus as claimed in claim 15, wherein said first wheel chock assembly is rotatable about said movable trunnion pivot bolt at said first chock assembly drive connector arm flange and said second wheel chock assembly is rotatable about said stationary trunnion pivot bolt at said second chock assembly drive connector arm flange.

18. A locking wheel chock apparatus for use with a single tire and wheel assembly, the locking wheel chock apparatus comprising:
  a first chock assembly having an inclined surface adapted to engage the tire;
  a second chock assembly having an inclined surface adapted to engage the tire, the inclined surfaces inclining away from one another; and
  means for tightening and loosening the apparatus, the means consisting of a single threaded assembly movably connecting the first chock assembly and the second chock assembly, the threaded assembly comprising: an elongated rotatable polygonal handgrip; a right hand threaded rod attached to one end of the hand grip; a left hand threaded rod attached to the other end of the hand grip; each chock assembly having a threaded connector, the right hand threaded rod threadedly engaging one chock assembly threaded connector, the left hand threaded rod threadedly engaging the other chock assembly threaded connector.

19. The locking wheel chock apparatus according to claim 18, wherein the handgrip extends in a direction parallel to the threaded rods.

20. A locking wheel chock apparatus for use with a single tire and wheel assembly, the locking wheel chock apparatus comprising:
  a first chock assembly having an inclined surface adapted to engage the tire;
  a second chock assembly having an inclined surface adapted to engage the tire, the inclined surfaces inclining away from one another; and
  a threaded assembly movably connecting the first chock assembly and the second chock assembly, the threaded assembly comprising: an elongated rotatable polygonal handgrip; a right hand threaded rod attached to one end of the hand grip; a left hand threaded rod attached to the other end of the hand grip; each chock assembly having a threaded connector, the right hand threaded rod threadedly engaging one chock assembly threaded connector, the left hand threaded rod threadedly engaging the other chock assembly threaded connector, wherein each chock assembly includes a laterally extending tab between the inclined surface and the threaded connector laterally offsetting the inclined surfaces from a longitudinal axis extending through the threaded assembly.

21. The locking wheel chock apparatus according to claim 20, wherein each chock assembly includes an axially extending tubular members the interior of the axially extending tubular member being threaded forming the threaded connector.

22. A method for chocking a single tire comprising:

providing a first chock assembly having an inclined surface adapted to engage the tire; a second chock assembly having an inclined surface adapted to engage the tire, the inclined surfaces inclining away from one another; and means for tightening and loosening the apparatus, the means consisting of a single threaded assembly movably connecting the first chock assembly and the second chock assembly, the threaded assembly comprising: an elongated rotatable polygonal handgrip; a right hand threaded rod attached to one end of the hand grip; a left hand threaded rod attached to the other end of the hand grip, each chock assembly having a threaded connector, the right hand threaded rod threadedly engaging one chock assembly threaded connectors the left hand threaded rod threadedly engaging the other chock assembly threaded connector;

rotating the handgrip in a first direction until the first chock assembly and the second chock assembly clear the tire;

positioning the locking wheel chock apparatus adjacent the single tire with the inclined surfaces of the first chock assembly and the second chock assembly proximate the tire;

rotating the handgrip is a second direction opposite the first direction, simultaneously moving the first chock assembly and the second chock assembly towards one another until the first chock assembly and the second chock assembly are tight against the tire.

\* \* \* \* \*

UNITED STATES PATENT AND TRADEMARK OFFICE
CERTIFICATE OF CORRECTION

PATENT NO. : 6,425,465 B1
DATED : July 30, 2002
INVENTOR(S) : Andrew Tallman et al.

It is certified that error appears in the above-identified patent and that said Letters Patent is hereby corrected as shown below:

Column 10,
Line 65, replace "body member;" with -- body member slidably received within an inside cavity defined by said first tubular body member; --.

Column 13,
Line 15, replace "members" with -- member, --.

Column 14,
Line 8, replace "connectors" with -- connector, --.

Signed and Sealed this

Twenty-second Day of October, 2002

*Attest:*

JAMES E. ROGAN
*Attesting Officer*    *Director of the United States Patent and Trademark Office*